F. A. BYLES.
ELECTRIC SYSTEM.
APPLICATION FILED JUNE 12, 1919.
1,415,309.
Patented May 9, 1922.
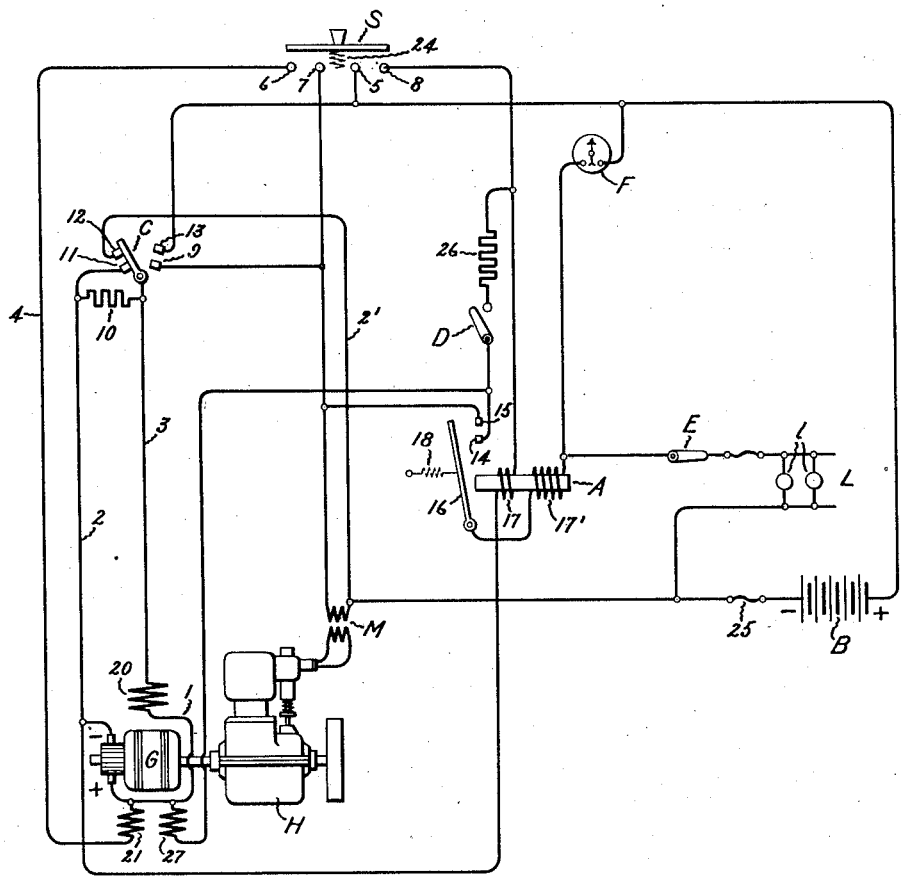
Inventor:
Frank A. Byles,
by Albert G. Davis
His Attorney.

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

ELECTRIC SYSTEM.

1,415,309.  Specification of Letters Patent.  Patented May 9, 1922.

Application filed June 12, 1919. Serial No. 303,601.

*To all whom it may concern:*

Be it known that I, FRANK A. BYLES, a citizen of the United States, residing at Schenectady, in the county of Schenectady, State of of New York, have invented certain new and useful Improvements in Electric Systems, of which the following is a specification.

My invention relates to that class of electric lighting and power systems which are especially adapted for use in isolated places, for example, in country residences or on farms, and in which are employed an internal combustion engine, a storage battery and a dynamo electric machine adapted to operate as a motor to crank the engine and as a generator to charge the battery and furnish electrical energy to a translating circuit.

One object of my invention is to provide a system of this class which is simple, reliable and inexpensive.

In accordance with this object I provide a manually controlled starting switch for connecting the storage battery to the terminals of the dynamo electric machine so that the machine operates as a motor to crank the engine and for connecting the storage battery to the ignition circuit of the engine to energize the same, and means for automatically connecting the battery and ignition circuit to the terminals of the dynamo electric machine independent of said starting switch so as to charge the battery when the engine begins to operate and the voltage of the dynamo electric machine reaches a predetermined value, and for automatically disconnecting the dynamo electric machine from the battery and opening the ignition circuit to shut down the engine and open the charging circuit when the battery is fully charged. This means consists of a relay having a coil connected to the terminals of the dynamo electric machine when the starting switch is in its operated position and arranged to operate the relay when the generator voltage reaches a predetermined value, and a locking coil connected in series with the charging circuit and arranged to hold the relay in its operated position as long as the charging current exceeds a predetermined value.

I also provide the dynamo electric machine with a series field winding which is inserted in the circuit connecting the storage battery to the terminals of the dynamo electric machine only when the starting switch is operated and another series field winding which is connected in the charging circuit. By using two series field windings in this way I am able to obtain a large starting torque and also to compound the dynamo electric machine when it is operated as a generator without having to reverse the connections of the series field winding as would be the case if only one series field winding were used. By compounding the generator in this way a tapering charge current is obtained which is very desirable.

I also provide a very simple switching arrangement whereby the engine can be operated for power purposes only. I further provide an arrangement whereby the battery can be readily overcharged. This arrangement consists of a switch for closing a circuit through the operating coil of the control relay independent of the starting switch so that the charging circuit will not be opened when the current in the charging circuit drops to the predetermined value.

Other features of my invention will appear in the following description and claims.

Referring to the accompanying drawing which illustrates a system embodying my invention, H represents an internal combustion engine which is connected to a dynamo electric machine G provided with the series field windings 21 and 27 and a shunt field winding 20. M represents the ignition coil of the engine H. B is a battery which is connected by means of switch E to the translating circuit L containing the translating devices 1. S is a starting switch which is arranged to connect contacts 5, 6, 7 and 8 together to complete a circuit for the dynamo electric machine G to operate the same as a motor to crank the engine H. This switch is normally kept in its open position by a spring 24. C is a two-position control switch. In one position this control switch C completes circuits for the generator G and in the other position it completes the circuit for the ignition coil M so that the engine H can be run for power purposes only. D is an overcharging switch which, when closed, causes the battery to be overcharged. A is a control relay having an energizing winding 17 adapted to be connected across the terminals of the dynamo electric machine G when the switch S is operated and a locking winding 17' which is adapted to be connected in series with the charging circuit so as to hold the relay in its operated position as long as the charging current exceeds a predetermined value. F is an indicator which indicates whether the battery is charging or discharging.

It is believed that a better understanding of my invention will be had by describing the operation of the system shown in the drawing.

In starting the engine H electrically, the cycle of the operation is as follows:

When the starting switch S is closed, current flows from positive terminal of battery B through contacts 5 and 6 of the starting switch S, lead 4 to the series field winding 21 of the dynamo electric machine G. After flowing through the series field a portion of the current enters the armature of the machine G through the positive brush and leaves through the negative brush, flowing back to the negative terminal of the battery B through lead 2, contacts 11 and 12 of the control switch C, lead 2' and fuse 25. Another portion of the current flows through lead 1, shunt field 20, lead 3, contacts 11 and 12 of the control switch C, lead 2' to the negative terminal of the battery B. The field windings 20 and 21 are wound so that they aid each other at this time, thereby producing a large torque for starting. A circuit is also closed through contact 7 of the starting switch S, connecting the battery to the ignition coil M. The armature of the dynamo electric machine G revolves when the current is supplied in the above mentioned manner and rotates the engine rapidly. With the starting switch S held down the engine will continue to rotate, the machine G acting as a driving motor, receiving current from the storage battery. The engine should begin to operate at once by its own power. As soon as it does, the speed thereof increases very rapidly and this causes the voltage of the machine G to increase thereby increasing the energization of the winding 17 of the control relay A which is connected across the terminals of the machine G through contact 8 of the starting switch S. At the proper voltage the excitation of this winding is sufficient to close the contacts 14 and 15 by attracting the armature 16. The closing of the contact 14 completes the charging circuit for the battery by connecting the positive brush of the machine G, which is now operating as a generator, with the storage battery through the series field winding 27, the locking winding 17' of the relay A and the electric indicator F. When the engine begins to run by its own power, the starting switch S is released thereby allowing the spring 24 to disconnect the contacts 5, 6, 7 and 8 from each other. The disconnection of contacts 5 and 6 opens the circuit through the series field winding 21. It will be evident that when the dynamo electric machine begins to operate as a generator that the current through the field winding 21 reverses and acts differentially with respect to shunt field 20. This is a condition not desired, and therefore this provision is made for opening the circuit through this winding when the starting switch S is released. If the battery is not completely charged the current flowing through the locking winding 17' is sufficient to hold the armature 16 attracted without the aid of the winding 17 which is deenergized when the starting switch S is released. The current for the ignition coil M is now supplied by the generator through the relay contact 15. As the charge of the battery B increases the current flowing through the charging circuit gradually grows less until a point is reached where the spring 18 overpowers the magnetic pull of winding 17'. This opens the charging circuit and also the ignition circuit of the engine so that the engine stops.

If it is desired to stop the engine by hand before it is stopped automatically by the control relay A, it may be done by opening the switch C for an instant. This opens the charging circuit and trips the control relay A when the current ceases to flow through the locking winding 17'.

It is desirable to give the storage battery an overcharge at certain intervals so as to keep the battery plates in good condition. The overcharge switch D is provided for this purpose. It will be noticed that when this switch is closed the positive brush of the machine G is connected through the resistance 26 to one end of the winding 17 of the control relay A. The resistance 26 is of such a value that current flowing through this circuit to the winding 17 is sufficient to hold the armature 16 attracted after being closed, but is not sufficient to attract it when open. It will be observed that with the overcharge switch D closed, the battery may be charged as long as desired as the armature 16 will be held attracted independent of the charging current. If the engine should stop for any reason while this overcharge is in process, the current in the locking coil 17' will reverse and cause the armature 16 to be released, thereby opening the charging circuit at contact 14 and the ignition circuit at contact 15.

It is also desirable to be able to operate engine H for power purposes only. This can be done by means of the control switch C. After the engine has been started in the regular manner the switch C is quickly thrown to its right-hand position. In this position the ignition coil is supplied with current from the storage battery through the switch C which connects the contacts 9 and 13. It will be noticed that when the switch C is in its left-hand position it closes a circuit between the negative terminal of the machine G and the negative terminal of the battery B, and also connects one terminal of the shunt field 20 to the negative terminal of the machine G. Therefore when the switch C is moved out of this position both the shunt field and the armature circuits of the machine G are open and therefore no electrical energy can be generated by the machine G. A high resistance 10 is connected across the conductors 2 and 3 so as to prevent a heavy field discharge when the switch C is moved from its left-hand position.

When the translating devices 1 are in use while the storage battery is being charged the generator divides its power automatically between the translating circuit and the storage battery. One side of the translating circuit is connected to a point between the end of the series locking coil 17' and the positive terminal of the battery B, the other side of the translating circuit being connected to a point between the negative terminals of the battery B and the machine G. This is done so that the current supplied to the translating circuit by the generator flows through the locking winding 17'. This prevents the armature 16 from tripping out at the point which it ordinarily would if no current was being supplied to the translating circuit. The length of time that the battery charge is prolonged will depend entirely upon the amount of current being supplied to the translating circuit. If the amount of current is very small the time will be extended but a short period, whereas with a heavier load, the engine will run as long as it is desired to operate the particular load which is beng used. This is an advantage as it is much more economical to supply a heavy load from the generator than to take it from the storage battery.

What I claim as new and desire to secure by Letters Patent of the United States, is:

1. The combination of an engine, an ignition circuit therefor, a dynamo electric machine connected to said engine and adapted to operate as a motor or as a generator, a storage battery, a manually controlled starting switch for connecting said storage battery to the terminals of said dynamo electric machine to operate said machine as a motor to crank said engine and for connecting said storage battery to said ignition circuit to energize the same, a relay having a coil connected to the terminals of said dynamo electric machine when said starting switch is operated, and arranged to operate said relay to connect said battery and said ignition circuit to the terminals of said dynamo electric machine independent of said starting switch so as to charge said battery, and a locking coil for said relay connected in series with said charging circuit and arranged to hold said relay in its operated position as long as the charging current exceeds a predetermined value.

2. The combination of an engine, an ignition circuit therefor, a dynamo electric machine connected to said engine and adapted to operate as a motor or as a generator, a storage battery, a manually controlled starting switch for connecting said storage battery to the terminals of said dynamo electric machine to operate said machine as a motor to crank said engine and for connecting said storage battery to said ignition circuit to energize the same, a relay having a coil connected to the terminals of said dynamo electric machine when said starting switch is operated, and arranged to operate said relay to connect said battery and said ignition circuit to the terminals of said dynamo electric machine through contacts of said relay and independent of said starting switch so as to charge said battery, and a locking coil for said relay connected in series with said charging circuit and arranged to hold said relay in its operated position as long as the charging current exceeds a predetermined value.

3. The combination of an engine, an ignition circuit therefor, a dynamo electric machine connected to said engine and adapted to operate as a motor or as a generator, said machine having an armature winding, a shunt field winding and a series field winding, a storage battery, a manually controlled starting switch for closing a circuit including said storage battery, said series field winding and said armature winding to operate said machine as a motor to crank said engine and for connecting said storage battery to said ignition circuit to energize the same, and a relay having a coil connected to said armature winding and arranged to operate when said machine is operating as a generator to complete a circuit independent of said starting switch connecting said battery and said ignition circuit to the terminals of said armature winding.

4. The combination of an engine, a dynamo electric machine connected thereto and adapted to operate as a motor or as a generator, a storage battery, a starting switch for closing a circuit including said storage battery and said dynamo electric machine to operate said machine as a motor to crank said engine, means operated when said dynamo electric machine is operating as a generator for closing a circuit between said machine and battery independent of said starting switch to charge said battery and for automatically opening said last mentioned circuit when said battery is fully charged, and means for preventing said circuit being opened by said circuit opening means so as to maintain said charging circuit closed to overcharge said battery.

5. The combination of an engine, a dynamo electric machine connected thereto and adapted to operate as a motor or as a generator, a storage battery, a starting switch for closing a circuit including said storage battery and said dynamo electric machine to operate said machine as a motor to crank said engine, a relay having a coil responsive to the voltage of said machine when operating as a generator for operating said relay to close a circuit between said machine and battery independent of said starting switch to charge said battery, a locking coil for said relay in series with said charging circuit and arranged to maintain said charging circuit closed as long as the charging current exceeds a predetermined value, and means for energizing said relay independent of said locking coil so as to maintain said charging circuit closed to overcharge said battery.

6. The combination of an engine, a dynamo electric machine connected thereto and adapted to operate as a motor or as a generator, a storage battery, a starting switch for closing a circuit including said storage battery and said dynamo electric machine to operate said machine as a motor to crank said engine, a relay having a coil adapted when said starting switch is operated to respond to a predetermined voltage of said generator when operating as a generator to operate said relay to close a circuit between said machine and battery independent of said starting switch to charge said battery, a locking coil for said relay in series with said charging circuit and arranged to maintain said relay operated as long as the charging current exceeds a predetermined value, and means for connecting said first mentioned coil across the terminals of said machine so as to maintain said charging circuit closed to overcharge said battery.

7. The combination of an engine, a dynamo electric machine connected thereto and adapted to operate as a motor or as a generator, a storage battery, a starting switch for closing a circuit including said storage battery and said dynamo electric machine to operate said machine as a motor to crank said engine, a relay having a coil adapted when said starting switch is operated to respond to a predetermined voltage of said generator when operating as a generator to operate said relay to close a circuit between said machine and battery independent of said starting switch to charge said battery, a locking coil for said relay in series with said charging circuit and arranged to maintain said relay operated as long as the charging current exceeds a predetermined value, and a manually controlled switch for connecting said first mentioned coil across the terminals of said machine so as to maintain said charging circuit closed to overcharge said battery.

In witness whereof, I have hereunto set my hand this 11th day of June, 1919.

FRANK A. BYLES.